(12) United States Patent
Lowberg

(10) Patent No.: US 10,465,403 B2
(45) Date of Patent: Nov. 5, 2019

(54) FECES ODOR ELIMINATOR

(71) Applicant: Alan Lowberg, Hope, ME (US)

(72) Inventor: Alan Lowberg, Hope, ME (US)

( * ) Notice: Subject to any disclaimer, the term of this patent is extended or adjusted under 35 U.S.C. 154(b) by 0 days.

(21) Appl. No.: 15/702,842

(22) Filed: Sep. 13, 2017

(65) Prior Publication Data

US 2019/0078344 A1   Mar. 14, 2019

(51) Int. Cl.
*E04H 1/12* (2006.01)
*F04D 13/16* (2006.01)
*F24F 7/007* (2006.01)

(52) U.S. Cl.
CPC .......... *E04H 1/1216* (2013.01); *F04D 13/16* (2013.01); *F24F 7/007* (2013.01); *F24F 2203/00* (2013.01)

(58) Field of Classification Search
CPC .................................................. E04H 1/1216
USPC ..................... 4/111.1, 111.5, 111.6, 460, 213
See application file for complete search history.

(56) References Cited

U.S. PATENT DOCUMENTS 5,192,428 A * 3/1993 Lindstrom ............. A47K 11/02
210/143

* cited by examiner

*Primary Examiner* — Christine J Skubinna

(57) ABSTRACT

I have designed a thermostatically controlled passive solar heater that blows by solar powered fan using very low wattage, warm air over a feces pile in an Improved Ventilated Privy (outhouse) for the purpose to dry or break the wet film over the feces pile rendering it odorless. I call it the Feces Odor Eliminator.

1 Claim, 1 Drawing Sheet

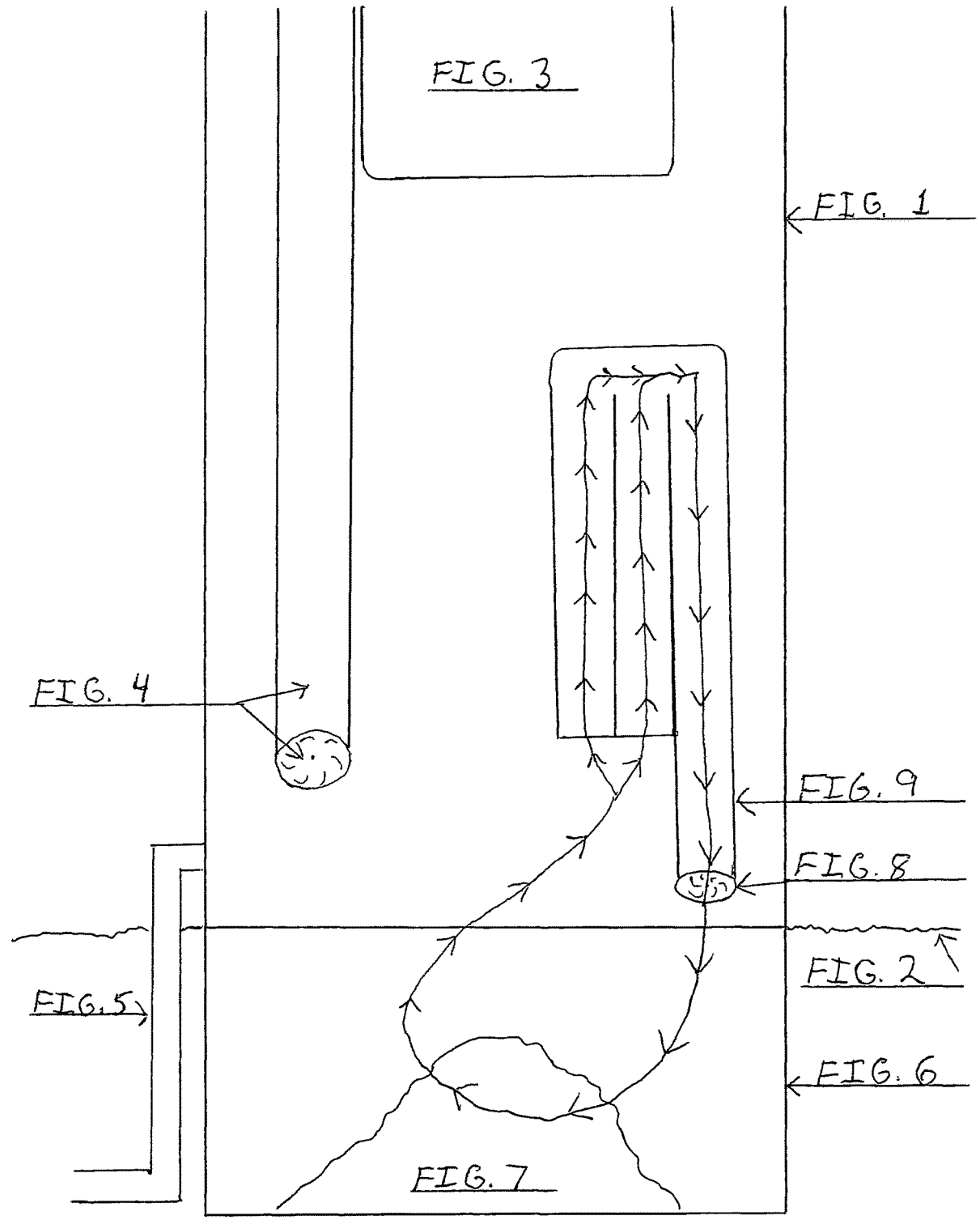

FECES ODOR ELIMINATOR

BACKGROUND

In January 2005 while on a new home construction site I had a bad experience with a rental plastic privy. The simplest way to describe the incident is to say, I sat down to poo and plop-splash on my backside, and because of time line I had to work in that all day. I immediately started thinking of a better toilet for job sites especially and other Places. My original design was a passive solar powered evaporator that used photovoltaics as well as passive solar heat that would dehydrate the wet film on the feces and evaporate the urine all in one. As far as odor I envisioned placing potpourri in the heater compartment and thought that any odor that would exit the roof would be sweet and not offensive. I built the prototype that Spring and had over three thousand dollars in just the shed. I estimated it would cost another two thousand for the tank, and another three thousand for all the solar dodades. I did not have the money to continue and gave up. I started making traditional style miniature outhouses for yard decorations instead. In 2015 I built a full size traditional looking outhouse (same design as miniature) and it sold right away. Then a fellow came by in 2016 and declined to buy because he said he wanted a compost outside toilet. Then I started thinking about real outhouses again. This time I tried to put out of my mind all the highfalutin information out there and build something simple. I knew about urine separation and saw they were diverting urine into its own short leach field. That alone (urine separation) helped eliminate a lot of odor, and with my elegant design gave me a saleable product that I am still selling faster than I can make them. But at night and in the morning when the atmosphere seems to settle down close to the ground I could smell the outhouse outside, and having a dog taught me what I might do. When my dog pooped on the lawn for the first few minutes the odor was very strong and then after a few minutes in the sun you couldn't smell it anymore, and that is when I went to work trying to develop a way to generate warm air and blow it over the poo-pile in a closed loop in order to break the wet film that causes the odor. I made the prototype in September 2016 and sold the first one Oct. 24, 2016. The heaters are now standard on all my units, and outhouses complete currently sell complete for $2,350.00.

SUMMARY

My invention seeks to eliminate all odor inside and outside of a Ventilated Improved Privy (Outhouse), particularly in the evening and morning when most noticeable when the atmosphere seems to settle back on the ground. I do this by using passive solar generated hot air blown over the feces pile on a continuous loop with a low power, thermostatic controlled solar powered electric fan. To my knowledge not even million dollar RV's address odor in this way and so they along with everyone in a campground shares each others wonderfulness every morning and evening.

DETAILED DESCRIPTION

Feces Odor Eliminator

The Feces Odor Eliminator invention is original. It is a passive solar heat collector made to operate inside of an Improved Ventilated Privy (outhouse). The purpose of the invention is to blow warm air across the feces pile in the holding tank below on a closed loop. The air is circulated by a small low power fan. The device is thermostatically controlled coming on at x+ and turning off at x- (it could vary for different climates). There is also an on/off switch for added control of device which has no part of this application for patent. This switch is mainly to conserve solar electricity if need be. The device is currently made of three 2.5"×3" aluminum gutter pipe painted flat black and mounted side by side. Two of the pipes are 3' feet long (intake), the other is 4' long (exhaust). At the base of this 4' pipe which comes nearly to the bottom of the shed/privy and slightly above the holding tank which extends approximately 27" below that, is the low powered fan.

Mounting

On the back side (out side and pointing south) (see FIG. 1) of privy (outhouse) a hole through the wall is cut approx. 13"×30" where the pipes are exposed to the sun. The pipes are covered with Lexan Polycarbonate clear material. This polycarbonate helps radiate the sun and makes the unit look better. This part may change upon finding better material or application. The invention once again is to collect passive solar heat and blow it across the feces pile in order to break the wet film on the feces and thus eliminate the odor. I am not inventing a new or better way to collect passive solar heat. I am however inventing a specific way to use the heat collected for a specific purpose which is to be used to break the wet film on a feces pile in an Improved Ventilated Privy (outhouse) in order to reduce or eliminate the odor.

The pipes are housed (enclosed) from the inside of the privy in a wooden box on the back side of shed or south side that measures aprox. 13"×30". The power supply is currently 12 volt solar but may operate on AC power. From the bench in the privy (see FIG. 2) where the toilet seat is mounted, the heat pipes extend down under the top of this bench. The bulk of the pipes are covered by the wooden box which is exposed on the back wall. My privy's use existing urine separation from the feces pile that effectively eliminates most odor, maybe 80%. My passive solar heaters' purpose is to eliminate all or nearly all of the remaining odor found on the feces by breaking the wet film on the surface of the feces. The size of this device and the materials used may vary, but the purpose, function, and operation will not. FIG. 1 and FIG. 2 are pictures showing outhouse not mounted on tank. See FIG. 2 to get idea of tank under outhouse. See brochure.

BRIEF DESCRIPTION OF DRAWING

FIG. 1 illustrates the back side or south side of outhouse shed above ground level.

FIG. 2 illustrates ground level.

FIG. 3 illustrates photovoltaic panel that supplies electrical power to two fans and one LED light not shown in drawing.

FIG. 4 illustrates vent pipe and fan.

FIG. 5 illustrates urine separation pipe.

FIG. 6 illustrates tank below ground level.

FIG. 7 illustrates feces pile.

FIG. 8 illustrates Feces Odor Eliminator fan.

FIG. 9 illustrates Feces Odor Eliminator and air flow direction. The Feces Odor Eliminator is a passive solar heat collector which is thermostat controlled, and Its purpose is to blow warm air over the feces pile and render it odorless.

I claim:

1. A Feces Odor Eliminator for retrofitting on an outhouse, the Feces Odor Eliminator comprising;
   a passive solar heat collector made from painted flat black aluminum tubes positioned behind polycarbonate glass, encapsulated on three sides and a top in a wooden box;
   A thermostat controlled circulating fan powered by a photovoltaic panel, the thermostat controlled circulating fan drawing air from a bottom of one or more heat collector tubes up through said tubes and directing hot air down through one said tube across a feces pile, on a continuous closed loop system;
   The feces odor eliminator configured for retrofitting on a south side of the outhouse.

* * * * *